July 28, 1964   W. J. MILLER   3,142,800
IN-PHASE CURRENT DETECTION
Filed Dec. 27, 1960

INVENTOR.
WILLIAM J. MILLER
BY Robert H. Montgomery
ATTORNEY

3,142,800
IN-PHASE CURRENT DETECTION
William J. Miller, Erie, Pa., assignor to General Electric Company, a corporation of New York
Filed Dec. 27, 1960, Ser. No. 78,726
2 Claims. (Cl. 324—107)

This invention relates to a new and improved network for accurately measuring the in-phase real power component of alternating current (A.C.), and has as a primary object the provision of a new and improved means for accurately deriving a signal proportional to the torque of an A.C. induction motor.

The features of the invention which are believed to be novel are set forth with particularity in the appended claims. The invention itself, both as to its organization and operation, together with further objects and advantages thereof, may best be understood by referring to the following description taken in connection with the drawings wherein:

Figure 1:
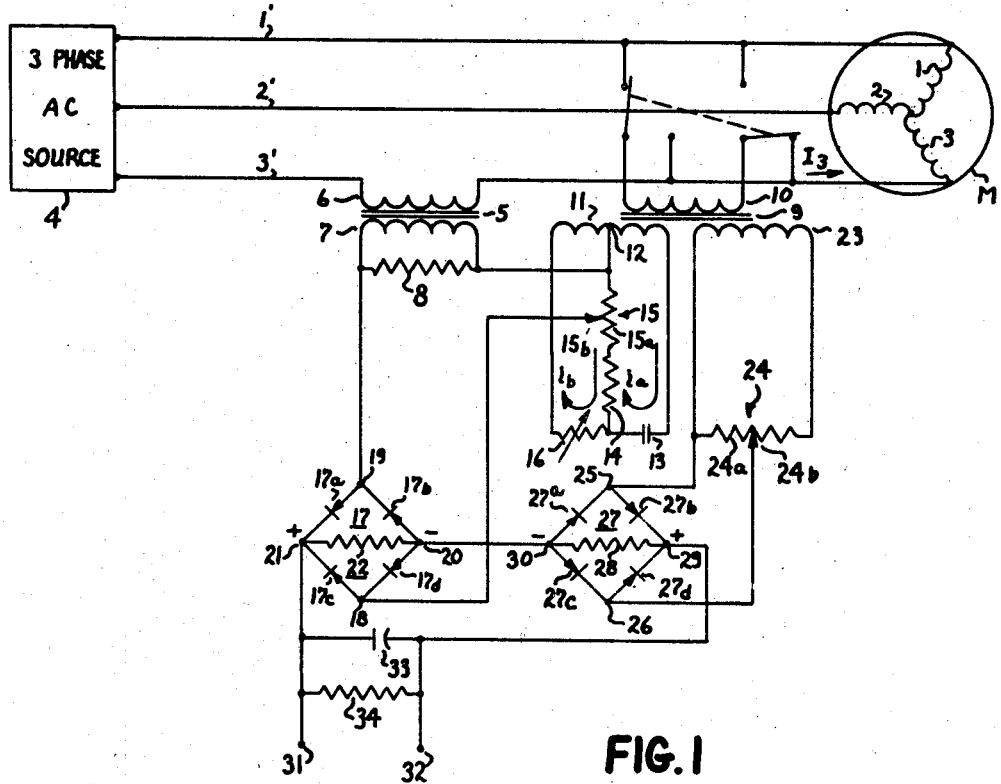
FIGURE 1 illustrates a circuit embodying the present invention.

Referring now to FIG. 1, I show an A.C. motor M having phase windings 1, 2 and 3 energized over lines 1', 2' and 3' from a three-phase A.C. source 4. The motor M is of the induction type and illustrated as having a Y-connected winding; however, the invention is equally applicable to an induction motor having delta-connected phase windings. A current transformer 5 having its primary winding 6 in line 3' through its secondary 7 produces a first alternating voltage across resistance 8 connected across secondary winding 7 which is proportional to total current in line 3'. A voltage transformer 9 having a primary winding 10 reversibly (for purposes of illustration) connectable across lines 1' and 3' induces a voltage in a first secondary winding 11 having a center tap 12. The secondary winding 11 feeds a first current path comprising a capacitor 13, a resistance 14 and a voltage divider or potentiometer 15 comprising a resistance portion 15a and an arm 15b; and a second current path comprising resistance 15a, resistance 14, and variable resistance 16. When a voltage $V_{ab}$ is induced in winding 11 by the line-to-line voltage $V_{31}$ across primary 10, a current $i_a$ will flow in the first described circuit path, and a current $i_b$ will flow in the second current path. It will be seen that these currents will be in opposition in the common circuit path comprising potentiometer resistance 15a and resistance 14, and current $i_a$ will be phase-shifted with respect to current $i_b$ by virtue of the capacitor 13. Capacitor 13 and resistance 16 comprise a phase shifting network so that the resultant phase shift may be selected by the value of capacitance of capacitor 13 and resistance 16.

Figure 2:
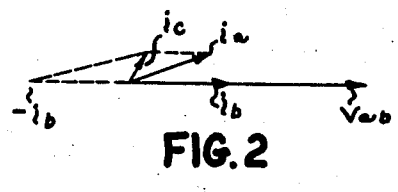
FIGURES 2 and 3 are vector diagrams which aid in explaining the operation of the circuit of FIGURE 1.

The relationship of the currents $i_a$ and $i_b$ is shown vectorially in FIG. 2 with respect to voltage $V_{ab}$, and it may be seen that the currents $i_a$ and $i_b$ will vectorially subtract to produce a resultant current $i_c$ through resistances 14 and 15a, which, by proper selection of the value of capacitor 13 and/or resistance 16, may be made to have a predetermined phase relationship with the voltage induced in secondary winding 11.

Figure 3:
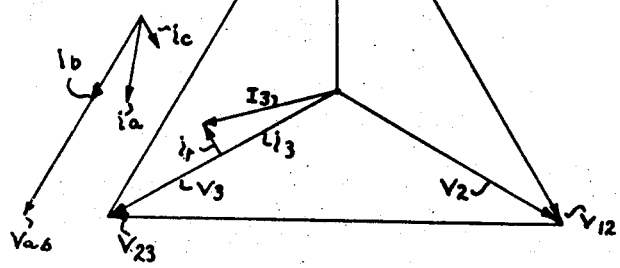

The overall relationship of line and phase voltages and currents may best be seen by reference to the vector diagram of FIG. 3, wherein vectors $V_{12}$, $V_{23}$ and $V_{31}$ represent the line-to-line voltages across lines 1', 2' and 3', and vectors $V_1$, $V_2$ and $V_3$ represent phase voltages of windings 1, 2 and 3 of motor M respectively. Consider the voltage vector $V_3$, which produces a current $I_3$ in winding 3 which has a real power component $i_3$, and a 90° lagging reactive power component $i_r$ which represents the magnetizing current drawn by the motor phase 3. While it is not illustrated in the vector diagram of FIG. 3, the other phases will draw like reactive and real current components. Since it is desired to measure only the real power component $i_3$, the first alternating voltage developed across resistance 8, which is proportional to $I_3$ is vectorially opposed, with a second alternating voltage in phase opposition to the reactive voltage component due to $i_r$ which is derived between brush arm 15b and center tap 12 in series with resistance 8. Inasmuch as current $i_c$ is derived from voltage $V_{ab}$ which is induced by voltage $V_{31}$, by properly connecting transformer primary 10 across lines 1' and 3', a voltage $V_{ab}$ is derived in a desired polarity. Voltage $V_{ab}$ produces currents $i_a$ and $i_b$ through resistances 14 and 15a which, when vectorially subtracted, produce current $i_c$ through resistances 15a and 14. As previously stated, by selecting the proper value of capacitor 13 and the resistance of resistor 16, $i_c$ may be made to be 180° out of phase with current $i_r$, and the voltage produced across the brush arm 15b and center tap 12 by $i_c$ may then be adjusted in magnitude to provide a second alternating voltage operative to cancel the $i_r$ component of the voltage across resistance 8. This relationship may best be seen in FIG. 3, where vector $i_c$ is in phase opposition to vector $i_r$.

Resistance 8 is in circuit with a rectifier bridge 17 having rectifying elements 17a, 17b, 17c and 17d, alternating current input terminals 18 and 19, and direct current output terminals 20 and 21 between which is connected resistance 22 to complete a circuit path. A circuit path may be traced from resistance 8, center tap 12, arm 15b, rectifying element 17c, resistance 22, rectifying element 17b, and return to resistance 8. Since the reactive voltages across resistance 8 and the voltage between center tap 12 and arm 15b can be accurately adjusted to be in phase opposition and of equal magnitude, the voltage appearing across terminals 20 and 21 is proportional to the real power component of current $I_3$. However, this voltage is not accurately representative of the torque output of motor M inasmuch as $i_3$ supplies the no-load losses (windage and friction) of the motor in addition to power output of the motor. To obtain a current accurately proportional to motor torque, I provide a second secondary winding 23 on transformer 9 which produces a voltage across resistance portion 24a of voltage divider or potentiometer 24. A voltage is picked off from brush arm 24b and one end of the resistance 24a and applied across terminals 25 and 26 of rectifier bridge 27 comprising rectifying elements 27a, 27b, 27c and 27d to produce a unidirectional potential across resistance 28 between terminals 29 and 30. The unidirectional voltage across terminals 29 and 30 is in opposition to the voltage appearing across terminals 20 and 21 of rectifier bridge 17 and a resultant potential appears across terminals 31 and 32 which is proportional to the power output of motor M. Since an induction motor is an essentially constant speed motor, the voltage across terminals 31 and 32 is also proportional to the torque output of the motor M. A capacitor 33 may be provided to smooth any ripple appearing in the voltage across terminals 31 and 32.

When the motor is running at no-load, arm 15b may be adjusted to produce minimum output at terminals 20 and 21 of rectifier bridge 17, which indicates that the reactive component of the voltage across resistance 8 has been cancelled and the output at terminals 20 and 21 is indicative of the real power component of the current in line 3'. Brush arm 24b of potentiometer 24 is then adjusted to subtract the no-load losses of the motor and any load driven by the motor so that no voltage appears across terminals 31 and 32. Thereafter, as the motor is loaded and the torque varied, the voltage appearing across terminals 31 and 32 will be proportional to the motor output torque, and this voltage may be utilized in a regulating circuit or other utilization device represented by resistance 34 where an accurate measure of the useful real power component of an A.C. induction motor is required.

The foregoing discussion has assumed the motor magnetizing current $i_r$ to be 90° reactive; however, that is not wholly true inasmuch as the magnetizing current is presented some resistance by the windings 1, 2 and 3. Therefore, the magnetizing current $i_r$ will lag current $i_3$ by less than 90°. However, inasmuch as the phase of current $i_c$ is variable, current $i_c$ may be made to be in phase opposition with current $i_r$ even though current $i_r$ is not completely reactive.

While I have disclosed one embodiment of the invention, other embodiments and modifications thereof may occur to those skilled in the art which do not depart from the spirit and scope of this invention. Accordingly, I intend to cover all modifications of the invention which do not constitute departures from the spirit and scope of the invention.

What I claim as new and desire to secure by Letters Patent of the United States is:

1. A network for measuring the in-phase current in a polyphase alternating current transmission network supplying a lagging power factor load comprising a current transformer having a primary winding in one line of said network and a secondary winding having a resistance load thereacross whereby the voltage across said resistance is a measure of the total current in said line, a voltage transformer having a primary winding connected across said one line and another line of said network, and a center-tapped secondary winding, said secondary winding supplying a first current loop comprising a capacitance and a potentiometer having one end of its resistance portion connected to said center tap and a second current loop comprising a resistance and said potentiometer, said resistance and said capacitance being selectable to provide a predetermined phase shift in the current through said potentiometer with respect to the voltage induced in said voltage transformer secondary winding to provide a current in phase opposition to the voltage component in said resistance load due to reactive current in said line, the contact arm of said potentiometer being set to produce a voltage between said arm and said center tap equal in magnitude to the reactive component of the voltage in said resistance load, means for connecting the voltages in series and rectifying the resultant to produce a unidirectional signal proportional to the in-phase current in said one line.

2. A network for measuring the torque output of a three-phase induction motor supplied electrical energy by a three-phase transmission line comprising: means for deriving a first alternating voltage proportional to the total current in one of said lines; a voltage transformer having a primary winding and first and secondary windings; means connecting said primary winding across said one line and another line; circuit means including said first secondary winding and a phase shifting network for deriving a second alternating voltage, said second alternating voltage being of equal magnitude and opposite in phase to the reactive component of said first alternating voltage; means for vectorially subtracting said first and second alternating voltages and rectifying the resultant to produce a unidirectional signal proportional to the in-phase current in said one line; and circuit means including said second secondary winding for decreasing said unidirectional signal an amount proportional to the no-load losses of said motor.

References Cited in the file of this patent
UNITED STATES PATENTS

| | | |
|---|---|---|
| 2,469,706 | Winter | May 10, 1949 |
| 2,498,057 | Winter | Feb. 21, 1950 |
| 2,647,232 | Ransom et al. | July 28, 1953 |
| 2,668,268 | Hunter et al. | Feb. 2, 1954 |
| 2,722,648 | Dunigan | Nov. 1, 1955 |

UNITED STATES PATENT OFFICE

CERTIFICATE OF CORRECTION

Patent No. 3,142,800

July 28, 1964

William J. Miller

It is hereby certified that error appears in the above numbered patent requiring correction and that the said Letters Patent should read as corrected below.

Column 4, line 17, after "and", second occurrence, insert -- second --.

Signed and sealed this 17th day of November 1964.

(SEAL)
Attest:

ERNEST W. SWIDER
Attesting Officer

EDWARD J. BRENNER
Commissioner of Patents